United States Patent [19]
Ball et al.

[11] Patent Number: 5,124,629
[45] Date of Patent: Jun. 23, 1992

[54] POST REGULATION CIRCUIT WITH ENERGY STORAGE

[75] Inventors: Don G. Ball, Livermore; Daniel L. Birx, Oakley; Edward G. Cook, Livermore, all of Calif.

[73] Assignee: The United States of America as represented by the United States Department of Energy, Washington, D.C.

[21] Appl. No.: 689,565

[22] Filed: Apr. 23, 1991

[51] Int. Cl.$^5$ .................. H02M 3/137; G05F 1/46
[52] U.S. Cl. .................... 323/268; 323/272; 323/86; 323/124
[58] Field of Search .............. 363/86, 90, 91, 124; 323/266, 268, 271, 272; 361/79, 18

[56] References Cited

U.S. PATENT DOCUMENTS

| | | | |
|---|---|---|---|
| 3,454,834 | 7/1969 | Giannamore | 361/79 |
| 3,965,409 | 6/1976 | Klautschek | 363/124 |
| 4,363,067 | 12/1982 | Radomski | 363/124 |
| 4,405,889 | 9/1983 | Overstreet et al. | 363/86 |
| 4,555,754 | 11/1985 | Hennevin | 363/124 |

Primary Examiner—Peter S. Wong
Attorney, Agent, or Firm—M. A. Valdes; Roger S. Gaither; William R. Moser

[57] ABSTRACT

A charge regulation circuit provides regulation of an unregulated voltage supply and provides energy storage. The charge regulation circuit according to the present invention provides energy storage without unnecessary dissipation of energy through a resistor as in prior art approaches.

9 Claims, 2 Drawing Sheets

POST REGULATION CIRCUIT WITH ENERGY STORAGE

FIELD OF THE INVENTION

The United States Government has rights in this invention pursuant to Contract No. W-7405-ENG-48 between the United States Department of Energy and the University of California for operation under Lawrence Livermore National Laboratory.

BACKGROUND OF THE INVENTION

The present invention relates to a post regulation circuit and in particular to a charge regulation circuit with energy storage, using an unregulated power supply for charging a capacitor to a desired voltage.

Charge regulation circuits are known in the prior art for regulating voltages in a wide variety of applications. In one approach, a circuit is provided to charge the capacitor to a voltage greater than the desired voltage, then to "bleed off" enough charge to obtain the desired voltage. The problem with such an approach is that a resistor is utilized which dissipates energy.

Another approach using unregulated voltage is to resonantly charge a capacitor using an LC circuit and then to "deQ" the inductor at precise times and voltages.

Problems with such prior art approaches in utilizing an unregulated power supply is the difficulty in attaining sufficient percentages of regulated voltages with good efficiency for applications requiring high repetition rates such as in a laser environment.

SUMMARY OF THE INVENTION

It is an object of the present invention to provide an improved charge regulation circuit that provides voltage regulation and in addition provides energy storage without unnecessary dissipation.

Briefly, the charge regulation circuit, according to the present invention, comprises an unregulated power supply, a first inductor connected to the power supply, a capacitor, and a first switch connected in a normally open position between the first inductor and the capacitor.

The circuit further includes means for closing the first switch so as to cause the capacitor to be charged through the first inductor to a voltage approximately twice the unregulated power supply voltage.

The circuit further includes a second inductor connected to the power supply and a second switch connected in a normally open position between the second inductor and the capacitor. Also included are means for closing the second switch so as to cause a discharge of the capacitor into the unregulated power supply through the second inductor, and means for opening the second switch when the capacitor is sufficiently discharged.

Other objects, advantages and novel features of the present invention will be set forth in part in the descrption which follows and in part become apparent to those skilled in the art upon examination of the following, or may be learned by practice of the invention. The objects and advantages of the present invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
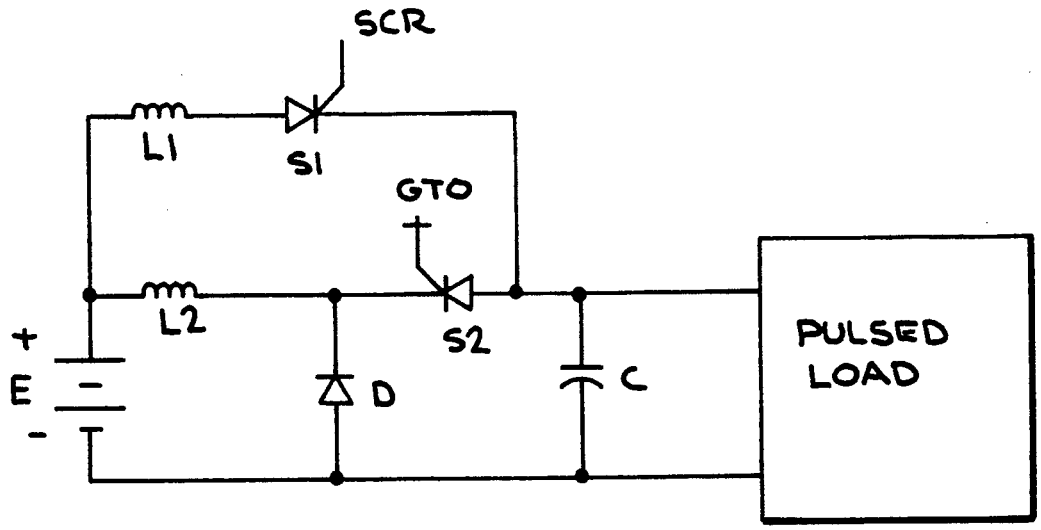
FIG. 1 depicts a schematic diagram of the regulation circuit according to the present invention.

Referring now to FIG. 1, an unregulated DC power supply E is connected to a first inductor L1. L1 in turn is connected to a switch S1 (normally an SCR) which in turn is connected to capacitor C. When switch S1 is closed, capacitor C will charge through inductor L1 to a voltage approximately 2 E. The charge on capacitor C can then be utilized, as necessary, as an input to a pulsed load, as shown in FIG. 1.

According to a novel aspect of the present invention, the stored charge on capacitor C can be "bled off" into power supply E by the following steps:

Switch S2 (normally a gate turnoff thyristor-GTO) is closed while switch S1 is normally open. Capacitor C can then discharge its stored energy through inductor L2 back to voltage power supply E. Diode D is connected between inductor L2 and the negative voltage of power supply E. Diode D protects against high voltage transients or spikes occurring across switch S2. Also, when switch S2 is turned off, diode D will provide a complete circuit through inductor L2. This allows the energy stored in L2 when S2 is opened to be transferred back to the power supply E.

In operation, inductor L2 is much larger than L1, in order to obtain good voltage regulation.

Figure 2:
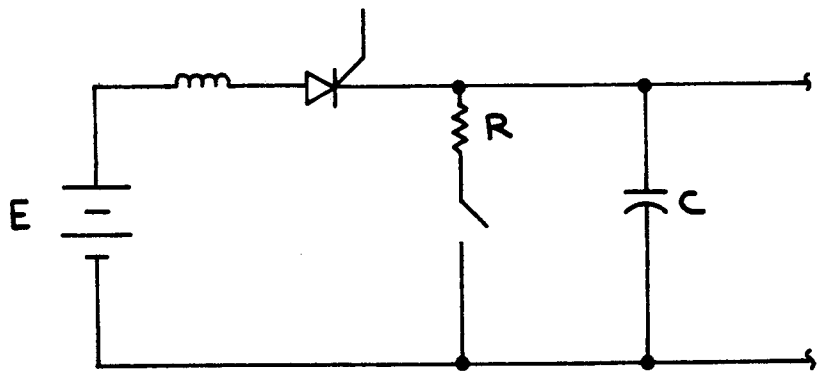
FIGS. 2 and 3 depict partial schematic diagrams of prior art of charge regulation circuits.
Figure 3:
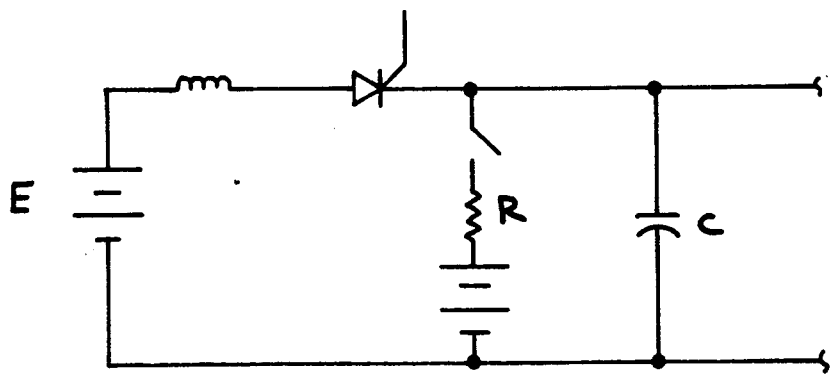

The present invention should be compared with prior art approaches such as depicted in FIGS. 2 and 3. In both FIGS. 2 and 3, a resistor R is utilized to dissipate excess energy (FIG. 2) or to put energy into the capacitor to the desired voltage (FIG. 3). The utilization of a resistor causes dissipation of energy, which should be contrasted with the post regulation circuit with energy storage according to the present invention.

Figure 4:
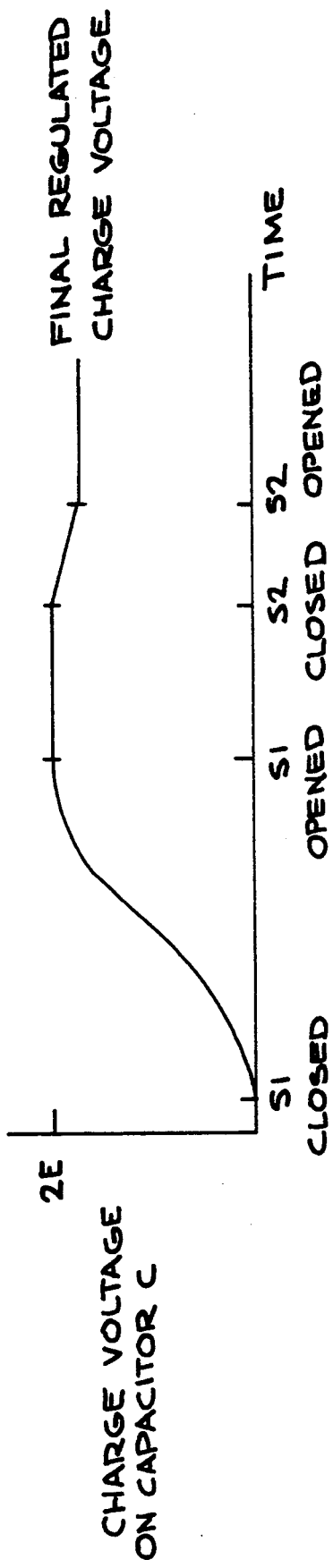
FIG. 4 depicts a timing diagram of the charge voltage on capacitor C of FIG. 1.
Figure 5:
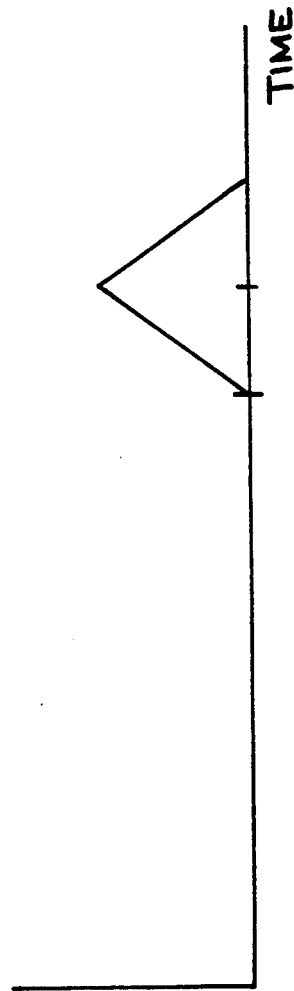
FIG. 5 depicts a timing diagram of the current through inductor L2 of FIG. 1.

FIGS. 4 and 5 depict timing diagrams for describing the operation of capacitor C and inductor L2, respectively. In FIG. 4, when switch S1 is closed, the charge across capacitor C rises to a value of approximately twice that of the unregulated power supply voltage E (or 2 E). At that time, switch S1 opens.

Later, switch S2 is closed, and the regulated voltage across capacitor C drops to the final regulated charge voltage at which time switch S2 is opened.

FIG. 5 depicts the current through inductor L2 at the time that the charge voltage on capacitor C is approaching the final regulated charge voltage.

When switch S2 is closed, the current through inductor L2 rises as indicated in FIG. 5. When switch S2 is opened, the current through L2 drops off in a similar fashion, as also indicated in FIG. 5.

The foregoing description of a preferred embodiment of the invention has been presented for purposes of illustration and description. It is not intended to be exhaustive or to limit the invention to the precise form disclosed, and obviously many modifications and variations are possible in light of the above teaching. The present embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:
1. A charge regulation circuit including:
   an unregulated power supply,
   a first inductor connected to said power supply,
   a capacitor,
   a first switch connected in a normally open position between said first inductor and said capacitor,
   means for closing said first switch so as to cause said capacitor to be charged through said first inductor to a voltage approximately twice the voltage of said power supply,
   a second inductor connected to said power supply,
   a second switch connected in a normally open position between said capacitor and said second inductor,
   means for closing said second switch so as to cause a discharge of the voltage stored on said capacitor into said power supply through said second inductor,
   means for opening said second switch when said capacitor is sufficiently discharged, and
   a diode connected between said second inductor and said power supply to provide protection against high voltage transients in said second switch and to provide a complete current path when said second switch is turned off.

2. A circuit as in claim 1 wherein said second inductor has a much higher value than said first inductor to provide improved voltage regulation.

3. A circuit as in claim 2 wherein said first switch is an SCR switch.

4. A circuit as in claim 3 wherein said second switch is a gate turn off thyristor.

5. A circuit as in claim 3 wherein said second switch is a field-effect transistor.

6. A charge regulation circuit comprising
   an unregulated power supply,
   a first inductor connected to said power supply,
   a capacitor,
   a first switch connected in normally open position between said first inductor and said capacitor,
   means for closing said first switch so as to cause said capacitor to be charged through said first inductor to a voltage approximately twice the voltage of said power supply,
   a second inductor connected to said power supply wherein said second inductor has a much higher value than said first inductor to provide improved voltage regulation,
   a second switch connected in a normally open position between said capacitor and said second inductor,
   means for closing said second switch when said capacitor is sufficiently discharged,
   a diode connected between said second inductor and said power supply to provide protection against high voltage transients in said second switch and to provide a complete current path when said second switch is turned off.

7. A circuit as in claim 6 wherein said first switch is an SCR switch.

8. A circuit as in claim 7 wherein said second switch is a gate turnoff thyristor.

9. A circuit as in claim 7 wherein said second switch is a field-effect transistor.

* * * * *